United States Patent Office 3,297,648
Patented Jan. 10, 1967

3,297,648
PROCESS FOR THE CHLOROMETHYLATION OF AROMATIC COMPOUNDS OF HIGH MOLECULAR WEIGHT
Herbert Corte, Opladen, and Otto Netz, Cologne-Ehrenfeld, Germany, assignors to Farbenfabriken Bayer Aktiengesellschaft, Leverkusen, Germany, a German corporation
No Drawing. Filed Nov. 24, 1964, Ser. No. 413,604
Claims priority, application Germany, Dec. 27, 1963, F 41,641
8 Claims. (Cl. 260—73)

Processes for the chloromethylation of aromatic compounds of high molecular weight, more especially polymers of aromatic vinyl compounds are already known. Many different materials have been employed as chloromethylation agents, for example, chloromethyl methyl ether, reaction mixtures of paraformaldehyde and hydrogen chloride, reaction mixtures of methylal and/or formaldehyde polymers of relatively low molecular weight and aluminium chloride and reaction mixtures of formaldehyde polymers of relatively low molecular weight, chlorosulphonic acid and alcohols or other polar oxygen-containing liquids which are not able to dissolve the compounds of high molecular weight. These known processes have the disadvantage that it is necessary, in order to carry them out, to use gaseous hydrogen chloride, the toxic chloromethyl methyl ether or additional swelling agents for the compounds of high molecular weight. Furthermore, the chloromethylation agents last referred to cause such considerable cross-linking of the compounds of high molecular weight that, unless swelling agents are also used, they can in practice only be used for the chloromethylation of compounds of high molecular weight when the compounds are not cross-linked.

It has now been found that these disadvantages can be avoided and chloromethyl groups can successfully be introduced into aromatic compounds of high molecular weight if these compounds are treated with a reaction mixture consisting of methylal and sulphuryl chloride, in the presence of a Friedel-Crafts catalyst.

When carrying out the chloromethylation, the most advantageous procedure is first of all to swell the aromatic compounds of high molecular weight in the reaction mixture of methylal and sulphuryl chloride and then to add a Friedel-Crafts catalyst and keep the reaction mixture for several hours preferably about 5 to about 20 hours at 20 to 100° C., advantageously 20 to 60° C. The amount of this reaction mixture used is preferably two to four times the weight of the polymer used, but larger or smaller amounts may be used.

Advantageously 2 mols of methylal are used for 1 mol of sulphuryl chloride in the preparation of the reaction mixture. It is, however, possible to employ quantities of 1 to 3 mols of methylal per 1 mol of sulphuryl chloride. The reaction between these two compounds is carried out generally at temperatures below +50° C. and advantageously from +10 to +30° C. In order to prepare the chloromethylation agent, either the sulphuryl chloride can gradually be added to the methylal or the methylal can be added to the sulphuryl chloride while cooling. One particularly advantageous method of preparation consists in continuously mixing the sulphuryl chloride and methylal in the required ratio by means of proportioning devices while cooling. Furthermore, it is also possible first of all to swell the aromatic compounds of high molecular weight, which contain aromatic nuclei capable of being chloromethylated, in methylal and then to add the sulphuryl chloride while cooling.

The molar ratio of methylal to sulphuryl chloride greatly influences the progress of the chloromethylation.

If less than about 2 mols of methylal are used for each mol of sulphuryl chloride, there is considerable cross-linking or post-cross-linking of the compounds of high molecular weight, whereas the use of more than about 2 mols of methylal per mol of sulphuryl chloride results in only a slight cross-linking or post-cross-linking of the compounds of high molecular weight.

Stannic chloride and zinc chloride are particularly suitable as Friedel-Crafts catalysts for carrying out the process according to the invention, though other Friedel-Crafts catalysts as e.g. aluminium chloride may be used. The nature of the Friedel-Crafts catalyst which is employed likewise influences the extent of cross-linking or post-cross-linking. Thus, stannic chloride, for example, causes less cross-linking or post-cross-linking than does aluminium chloride.

The action of the chloromethylation agents on the aromatic compounds of high molecular weight in the presence of Friedel-Crafts catalysts advantageously takes place at temperatures from +20 to +60° C.

The aromatic compounds of high molecular weight which are used for carrying out the present process are known per se. Particularly suitable for the purpose are cross-linked or non-cross-linked polymers based on aromatic vinyl compounds. Suitable non-cross-linked, linear polymers are polymers or copolymers of aromatic monovinyl compounds, such as styrene, vinyl toluene, vinyl naphthalene, copolymers of aromatic monovinyl compounds and other monoolefinic unsaturated compounds or compounds with conjugated carbon-carbon double bonds, which are capable of copolymerising with the aromatic monovinyl compounds. Particularly suitable as cross-linked aromatic compounds of high molecular weight are copolymers of a major proportion of aromatic monovinyl compounds, such as styrene, substituted styrenes or vinyl naphthalene, and a minor proportion of aromatic or aliphatic compounds with several non-conjugated carbon-carbon double bonds, such as divinyl benzene, substituted divinyl benzenes, trivinyl benzene, divinyl ketone and esters of polyhydric alcohols with olefinically unsaturated carboxylic acids, such as ethylene glycol dimethacrylate. These copolymers may have a gel structure or a sponge structure. Such copolymers are for example described in German patent specifications 829,223, 841,796, 848,257 and in U.S. patent specifications 2,597,439 and 2,597,440 and also in German auslegeschrift 1,045,102.

The polymers and copolymers are advantageously used in the form of bead polymers. When using non-cross-linked bead polymers, if it is desired to retain the bead form when carrying out the process according to the invention, it is advisable that the non-cross-linked bead polymers should be added to a preformed reaction mixture of methylal and sulphuryl chloride, already containing the Friedel-Crafts catalyst.

The chloromethylation products which are obtainable according to the invention are valuable intermediates for the preparation of ion exchangers. For example, they can be converted into anion exchangers, in accordance with processes known per se, by reaction with amines.

*Example 1*

540 g. of sulphuryl chloride are introduced dropwise at 15 to 20° C. into 620 g. of methylal while cooling and stirring and the mixture is stirred for another hour at 20 to 25° C. A crystal-clear reaction liquid is formed and 400 g. of a styrene bead polymer cross-linked with 3% of divinyl benzene are added to this while stirring. In the course of three hours, the bead polymer has swollen in the reaction liquid, but the complete mass can still be stirred. After adding 40 g. of stannic chloride, the mass was heated at 45° C. for 7 hours. After filtering off the brown reaction liquid with suction, the beads are first of all treated with ice and then several times with water and suction-filtered. A sample of the moist reaction product was extracted with tetrahydrofuran and dried: Chlorine content 19.5%.

Reaction of the moist chloromethylation product with an excess of trimethylamine in aqueous solution leads to a strongly basic anion exchanger with a total capacity of 1.4 mval./ml. chloride form.

*Example 2*

270 g. of sulphuryl chloride were introduced dropwise at 15 to 20° C. into 310 g. of methylal while stirring and cooling and the liquid was stirred for another hour. 200 g. of a styrene bead polymer cross-linked with 2% of divinyl benzene, are swelled at 30° C. in the crystal-clear liquid that is formed. After one hour, the swelling was ended. After adding 20 g. of stannic chloride, the mixture was heated at 45° C. for 7 hours. After filtering off the brown reaction liquid with suction, the residue was treated with iced water and washed several times with water. A sample, extracted with tetrahydrofurn and dried, has a chlorine content of 19.5%.

If a p-vinyl toluene bead polymer cross-linked with 2% of divinyl benzene was reacted in similar manner, a chloromethylated product, which contained 16.9% of chlorine, was formed.

*Example 3*

270 g. of sulphuryl chloride were introduced dropwise at a temperature below 15° C. into 310 g. of methylal while cooling and stirring. 200 g. of a styrene bead polymer, cross-linked with 6% of ethylene glycol dimethacrylate, were added to the clear liquid which formed. After 4 hours the polymer had swelled and then 100 g. of anhydrous zinc chloride were added and the mixture was kept for 10 hours at 40° C. The reaction mixture slowly became thicker, so that 400 ml. of petroleum ether were added so as to keep the mixture in a condition suitable for stirring. After cooling, the brown reaction liquid was suction-filtered and the beads were treated with ice and also several times with water. The chloromethylation product contained 18.5% of chlorine and, after treatment with trimethylamine, yielded a strongly basic anion exchanger with a total capacity of 1.3 mval./ml. in the chloride form.

If, instead of the zinc chloride, 50 g. of anhydrous aluminium chloride were used as catalyst, there was strong evolution of HCl and the chloromethylation product only yielded 450 ml. of strongly basic anion exchanger with a total capacity of only 0.3 mval./ml. in the chloride form.

*Example 4*

620 g. of methylal were introduced dropwise at a temperature below 20° C. into 540 g. of sulphuryl chloride while stirring and cooling. 400 g. of a styrene bead polymer, cross-linked with 3% of divinyl benzene, were swelled within 3 hours in the reaction liquid. After adding 40 g. of stannic chloride, the mixture was heated at 40° C. for 12 hours, the product was cooled and the reatcion liquid filtered off with suction. The chloromethylation product contained 20.3% of chlorine and, on treatment with aqueous trimethylamine, yielded a strongly basic anion exchanger with a total capacity of 1.5 mval./ml. in the chloride form.

*Example 5*

810 g. of sulphuryl chloride were introduced at a temperature below 20° C. into 620 g. of methylal while stirring and cooling. 400 g. of a styrene bead polymer, cross-linked with 2% of divinyl benzene, were swelled for 2 hours in the reaction liquid and, after adding 40 g. of stannic chloride, heated at 45° C. for 7 hours. After filtering off the brown reaction liquid with suction, the chloromethylated beads were treated with ice and then with water. The chloromethylation product contained 19.3% of chlorine and, upon treatment with aqueous trimethylamine solution, yielded a strongly basic anion exchanger with a total capacity of 1.4 mval./ml. in the chloride form.

If the same experiment was carried out with 930 g. of methylal and 540 g. of sulphuryl chloride, the chloromethylation product contained 17.5% of chlorine and, on treatment with aqueous trimethylamine, yielded a strongly basic anion exchanger with a total capacity of 1.2 mval./ml. in the chloride form.

*Example 6*

Methylal and sulphuryl chloride in a molar ratio of 2.1:1 were introduced continuously in measured quantities into an externally-cooled glass tube, the length of which was such that the exothermic reaction was ended at the outlet end. 500 g. of a cross-linked bead polymer, having a sponge structure and obtained by suspension polymerisation of 8% divinyl benzene (technical 50%) and 92% styrene in the presence of 70% (based on the weight of the monomer) of hydrogenated triisobutylene, were swelled in 1700 g. of the reaction liquid thus obtained. After adding 40 g. of stannic chloride, the mixture was heated at 40 to 45° C. for 10 hours, then cooled and the excess chloromethylation agent was decomposed by adding ice. After repeated washing with water, the reaction product had a chlorine content of 21.3%.

Treatment with aqueous trimethylamine solution led to the formation of a strongly basic anion exchanger with a sponge structure and a total capacity of 1.0 mval./ml. chloride form.

*Example 7*

50 g. of stannic chloride were dissolved in 1200 g. of a reaction mixture prepared by means of a proportioning device from sulphuryl chloride and methylal (molar ratio 1:2.2). 400 g. of a non-cross-linked styrene bead polymer (trade name Vestyron N) were then slowly added at 20 to 25° C. and the resulting mixture was kept for 4 hours at 40 to 45° C. After suction-filtering the reaction liquid, the beads were treated with ice and several times with water. The chloromethylated insoluble chloromethylation product, which could only partly be swelled, had a chlorine content of 20.3%. Reaction with aqueous trimethylamine solution 40° C. led to the formation of 3800 ml. of a strongly-basic anion exchanger with a total capacity of 0.7 mval./ml. in the chloride form.

*Example 8*

360 g. of methylal were introduced dropwise at 20° C. into 300 g. of sulphuryl chloride while cooling. After the exothermic reaction had subsided, 100 g. of stannic chloride were dissolved in the mixture and then 200 g. of a non-cross-linked styrene bead polymer (trade name Vestyron N) were introduced while stirring vigorously. After a reaction lasting 10 hours at 40° C., the reaction mass was filtered with suction and the residual solid was treated with ice and then with water. The insoluble beads could only be swelled to a limited extent and had a chlorine content of 15%.

We claim:

1. In the process for chloromethylating polymers of aromatic vinyl compounds by reacting said polymers with a chloromethylating agent in the presence of a Friedel-Crafts catalyst, the improvement which comprises chloromethylating said polymers with the reaction product of sulphuryl chloride and methylal at a temperature of 20 to 100° C. in the presence of the Friedel-Crafts catalyst and recovering the chloromethylated polymer, said reaction product of sulphuryl chloride and methylal being prepared at a temperature below 50° C. by reacting 1 mol of sulphuryl chloride with from 1 to 3 mols of methylal.

2. The process of claim 1 wherein said Friedel-Crafts catalyst is selected from the group consisting of tin tetrachloride, zinc chloride and aluminum chloride and said temperature of 20 to 100° C. is maintained for about 5 to about 20 hours.

3. The process of claim 1 wherein said reaction product of sulphuryl chloride and methylal is employed in an amount of about two to four times the weight of said polymer.

4. The process of claim 1 wherein said polymer, in the form of beads, is allowed to swell in said reaction product of sulphuryl chloride and methylal, a Friedel-Crafts catalyst selected from the group consisting of tin tetrachloride, zinc chloride and aluminum chloride is added, the resulting mixture is maintained at a temperature of 20 to 100° C. for about 5 to about 20 hours and the chloromethylated polymer is then recovered.

5. The process of claim 1 wherein said polymers of aromatic vinyl compounds are selected from the group consisting of linear homopolymers, polymers of aromatic monovinyl compounds, linear copolymers of aromatic monovinyl compounds and monoolefinically unsaturated compounds, linear copolymers of aromatic monovinyl compounds and compounds having conjugated carbon-carbon double bonds, and cross-linked polymers of aromatic monovinyl compounds and of compounds having at least two non-conjugated carbon-carbon double bonds.

6. The process of claim 1 wherein said polymer is a cross-linked copolymer of styrene and divinyl-benzene.

7. The process of claim 1 wherein said polymer is a cross-linked copolymer of styrene and glycol dimethacrylate.

8. The process of claim 1 wherein said polymer is polystyrene.

References Cited by the Examiner

UNITED STATES PATENTS

| 2,694,702 | 11/1954 | Jones | 260—93.5 |
| 2,926,202 | 2/1960 | Lane | 260—561 |
| 3,185,667 | 5/1965 | Ayers et al. | 260—67 |

FOREIGN PATENTS

| 778,749 | 7/1957 | Great Britain. |

OTHER REFERENCES

Adams et al.: "Organic Reactions," vol. 1, published by Wiley, 1942, pages 6 and 71, QD–251, Q7–C.5.

JOSEPH L. SCHOFER, Primary Examiner.

JAMES A. SEIDLECK, Examiner.